Patented Nov. 24, 1953

2,660,551

UNITED STATES PATENT OFFICE 2,660,551

METHOD FOR THE PRODUCTION OF DEXTRAN OF RELATIVELY LOW MOLECULAR WEIGHT

Harold J. Koepsell, Henry M. Tsuchiya, and Nison N. Hellman, Peoria, Ill., assignors to the United States of America as represented by the Secretary of Agriculture No Drawing. Application March 11, 1952,
Serial No. 276,033

7 Claims. (Cl. 195—31)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This invention relates to the preparation of the polysaccharide, dextran. It relates, in particular, to the polymerization reaction whereby sucrose is utilized as a raw material to produce a polymer of glucose in which the recurring anhydroglucose units are linked predominately at the 1-6 positions. More particularly, it relates to novel polymerization methods whereby the polymerization is carried out with the assistance of dextran-synthesizing enzymes under conditions which inherently result in a dextran product of low molecular weight. Still more particularly, it relates, in one of its major phases, to carrying out the dextran synthesis in the absence of appreciable quantities of microorganisms.

In this specification and claims, the generic term "dextran" refers to the polysaccharide commonly known in the art as "native" dextran, which may be characterized as a polymer of glucose in which the recurring anhydroglucose units are linked predominately through the 1-6 positions. The term, as used herein, includes such polymers which possess a molecular weight range of from 1,000 upward to many millions. This invention relates also in several of its phases to polymers of molecular weight of less than 1,000, which compounds may be termed "oligosaccharides."

Dextran has generally found value as a carbohydrate gum having a wide variety of industrial uses. Many of its uses, particularly those relating to blood volume expanders, require a molecular weight range which is lower than that found in the native dextran as commonly produced by microbiological synthesis. This high molecular weight is characteristic, whether the native dextran is produced by prior whole culture synthesis wherein the dextran-producing organisms remain in the synthesis liquors during the formation of the dextran, or by the recently developed enzymic synthesis wherein the dextran-producing enzyme (dextransucrase) is produced in a separate, initial step, separated from the microorganisms, and then employed for the dextran synthesis as a subsequent step. This latter method of synthesis is disclosed and claimed in copending applications Ser. No. 215,623, filed March 15, 1951, by Koepsell, Kazenko, Jeanes, Sharpe and Wilham, and Ser. No. 256,586, filed November 15, 1951, by Tsuchiya and Koepsell.

Because of the very minor proportion of low molecular weight dextran compared with the high molecular weight dextran, prior workers have not assigned to the former appreciable economic significance. We have now discovered that the proportion of low molecular weight dextran can be increased materially by a relatively simple, yet novel, control of the environment of the dextran synthesis. We have discovered that the relative proportion of this low molecular weight dextran increases as the initial sucrose concentration in the polymerization medium is increased. The low molecular weight produced according to our invention may be recovered by simple fractionation methods as a separate, economically significant product having a variety of uses not possessed by the dextran of high molecular weight.

Our low molecular weight dextran, which is novel at least insofar as being an economically significant product obtained by direct synthesis, is characterized by a molecular weight which may vary from as low as 6,000 to as high as 400,000, the particular ranges within these limits depending upon certain variables as will be explained in detail below.

The low molecular weight dextran produced by our invention is useful as a thickening agent, as an adhesive, as a protective colloid, and as an intermediate in plastics and pharmaceuticals. It appears to possess utility similar to that of the various dextrins and to be useful for many of the purposes in which the so-called "native dextran" of high molecular weight is now used. In addition, by virtue of its molecular structure, it possesses useful properties, particularly in the lower molecular weight ranges, not shared by either the dextrins or the native dextrans.

We effect control over the proportion of the two dextrans, produced by the enzyme from a given microbiological source, i. e., the dextran possessing a molecular weight of one million or higher and the dextran possessing a molecular weight of 1,000 to 400,000, by controlling the concentration of sucrose in the synthesis medium. We have discovered that the proportion of low molecular weight dextran increases as the initial concentration of sucrose in the synthesis medium is increased.

Characteristically, the proportion of the low molecular weight product is produced in economically significant amounts as the sucrose concentration is increased to above that normally used in the preparation of native dextrans. At concentrations of 25 to 30 grams sucrose per 100 ml. of solution, the quantity of recoverable low molecular weight dextran becomes considerable and increases as the concentration of sucrose is increased. At concentrations of 30–40 grams per 100 ml., the proportion of low molecular weight dextran frequently becomes the predominating product of the synthesis, and at 60–80 grams per 100 ml. of solution the low molecular weight dextran is usually the sole product of the synthesis.

As previously mentioned, dextran may be produced enzymatically, in the absence of microorganisms. This method of dextran synthesis is important in carrying out our present invention, for it affords the production of dextran at high sucrose concentrations. Although our invention is not so limited, we prefer to carry out our novel process by the enzymic method, since much higher sucrose concentrations are operable than are tolerated by the microorganisms themselves.

The molecular weight and structure of the dextran produced according to our invention, i. e., the low molecular weight product, is affected by the particular microorganism involved. Where enzymic synthesis methods are used, the particular molecular weight is affected by the microbiological source of the dextran-producing enzyme. The dextran-synthesizing organism used in this invention may be any organism of the genus Leuconostoc which produces dextran as a major metabolic product under the dextran synthesizing conditions familiar to the art. Within these classes of organisms, some produce, in our inventive method, a product of the low molecular weight type having a molecular weight as low as 1,000 or less. Other microorganisms result in a low molecular weight dextran having a molecular weight of 10,000 to 20,000, while still others produce a low molecular weight dextran in the higher limits as heretofore disclosed. Still another variable which is dependent upon the organism source of the enzyme is the particular structure and mode of linkage between glucopyranosyl groups in the molecule. The ratio of 1-6 to non-1-6 linkages appears to be affected by the particular organism source.

Utilizing our discoveries, we conduct dextran synthesis, preferably by the enzymic method in sucrose solutions which may vary from 25 grams per 100 ml. up to saturation with sucrose. The dextransucrase enzyme may be prepared in accordance with the disclosure of the copending applications previously acknowledged. We may use either the crude culture filtrate, or the isolated enzyme preparation as obtained in accordance with those applications. We may, in general, employ culture liquors rich in dextransucrase, as for example, those from previous dextran syntheses which actually contain the unseparated cells, or the culture of the previously mentioned copending applications before cell removal. We may also employ whole culture methods, but these methods are usually limited to sucrose solutions of about 35 grams per 100 ml. concentration or less, depending upon the specific sucrose tolerance of the microorganism employed.

The concentration of dextransucrase employed in our invention, or the relative proportion of the enzyme with respect to the sucrose in the synthesis medium, may vary over a wide range. Increasing the amount of enzyme units usually has the effect of accelerating the polymerization.

Our invention thus affords means for producing significant quantities of low molecular weight dextran in the form of easily separable mixtures with high molecular weight dextran, both products being highly and uniquely useful. It affords, moreover, means for controlling the relative proportion of the two dextrans produced as well as means for predetermination of the character of the low molecular weight material. The former is accomplished by varying the concentration of sucrose in the polymerization medium, whereas the latter is accomplished by selection of the particular dextransucrase composition giving the required product, especially as pertains to the particular organism source of the enzyme. As previously stated, the enzyme may be prepared by the method of the noted copending application. This involves cultivation of a dextran-producing organism on a lean sucrose medium until all the sucrose is used up and then recovering the enzyme by removing the cells of the organism. The culture liquor may be used directly in the polymerization process, in which case the sucrose may merely be added thereto. Alternatively, the enzyme may be recovered from the culture liquor by evaporation or precipitation and used when and as desired. The improved method of enzyme production disclosed and claimed by Tsuchiya and Koepsell in application Ser. No. 256,586 may be employed. This improvement involves conducting the enzyme synthesis within a pH range of 6.0 to 7.0 and thereafter substantially immediately altering the pH to 4.8–5.5 to avoid enzyme breakdown.

The following specific examples illustrate our invention.

EXAMPLE 1

Leuconostoc mesenteroides NRRL B–512 was grown in a medium containing 2 percent sucrose, 2 percent corn steep liquor solids, 0.1 percent potassium monobasic phosphate, and small amounts of nutrient salts. The pH of the medium was maintained at 6.5 to 6.8 by the addition of caustic solution as needed, and the temperature was maintained at 25° C. The medium was stirred and aerated during the fermentation. Sucrose utilization was complete within 10 hrs., and the culture was immediately adjusted to pH 5.0 and cooled overnight to minimize enzyme destruction. The next morning the culture was adjusted to pH 7.0 by the addition of alkali. This resulted in a precipitation of insoluble matter, which was removed along with the cells by filtration. The clear, amber solution was immediately adjusted to pH 5.0 for stability maintenance. Upon assay, it was found to contain 42 units of dextransucrase per ml., where one unit is defined as the amount of enzyme which will convert 1 mg. of sucrose to dextran in 1 hr. under optimal conversion conditions.

A series of reaction mixtures was made up containing this culture filtrate, and varying amounts of sucrose in the range of initial concentrations of 10 to 70 grams per 100 ml. of solution, adjusted to pH 5.0, and incubated at 30° C. until conversion of sucrose to dextran, as measured by the production of fructose, had ceased. The amounts of fructose produced coincided closely to the theoretical amounts corresponding with the weight of sucrose taken. In the series of flasks, a marked difference in opalescence and especially viscosity was noted, the flasks containing the higher proportion of sucrose exhibiting the lesser degrees of the phenomena.

The crude dextran product was obtained from the reaction mixtures by adding alcohol to give an 85 percent solution. The precipitate was of a gummy character, and tended to produce insoluble, aggregated masses. Separation of the dextran was accomplished by centrifugation. The crude dextran was then suspended in water with autoclaving to produce an essentially colorless solution. The overall yield of dextran was determined by optical rotation, on the basis that purified dextran possesses a specific rotation of +205°. This solution was diluted to a 2-percent solution, and 5 ml. aliquots were treated with absolute ethanol to give the results described in Table I below. This cumulative alcohol fractionation, as shown in the table, gives a distribution of the dextrans produced arranged in accordance with their respective molecular weights; the higher molecular weight product being precipitated by the lower concentration of ethanol. Examination of the table discloses that the dextrans produced can be differentiated into two major groups on the basis of molecular size. The first to precipitate, at alcohol concentrations up to 42 percent, is the so-called "native" high molecular weight dextran. The second, that which precipitates at alcohol concentrations greater than 42 percent, is the lower molecular weight small dextran. It is also seen that the size of the small dextran component differed in the reaction mixtures, and that small dextran produced at 70 grams of sucrose per 100 ml. of solution, which failed to precipitate at less than 60 percent alcohol, was appreciably smaller than the small dextran produced at 30 grams of sucrose per 100 ml. of solution which precipitated at alcohol concentrations in the range of 50 to 80 percent alcohol.

Additional portions of the individual reaction mixtures were precipitated with alcohol at 75 percent to obtain the dextran product as described above. High molecular weight dextran was removed by precipitation at 42 percent alcohol, and the small dextran was obtained by precipitation from the supernatant liquid at 75 percent alcohol. The molecular weight of the small dextran was determined by light scattering methods. The analysis indicated that the average molecular weight of the small dextran produced at 30 percent sucrose was about 24,000, while that produced at 50 percent sucrose was about 10,000. The latter small dextran product was divided into two portions on the basis of solubility or insolubility at 55 percent alcohol. By viscosity measurements the soluble portion had a molecular weight below 10,000, while the insoluble portion had a molecular weight of about 13,000.

The small dextran, precipitating above 42 percent alcohol, was identified as being a dextran by the characteristic infra-red absorption spectrum of dextran. The small size of this dextran was also manifested by the low viscosity and lack of opalescence of its solutions.

*Table I.—Cumulative alcohol precipitation of B-512 dextran obtained at various sucrose concentrations*

| Sucrose, g./100 ml. of solution | Mg. dextran precipitated [1] | | | | | | | | |
|---|---|---|---|---|---|---|---|---|---|
| | Percent ethanol | | | | | | | | |
| | 36 | 38 | 42 | 45 | 50 | 55 | 60 | 65 | 70 | 80 |
| 10 | 91 | 94 | 96 | 96 | 94 | 94 | 94 | 98 | 100 | 100 |
| 30 | 30 | 43 | 43 | 49 | | 79 | 82 | 91 | 97 | 92 |
| 50 | 0 | 13 | 15 | 14 | 28 | 42 | 74 | 94 | 98 | 96 |
| 70 | 0 | 0 | 0 | 0 | 0 | 0 | 0 | 36 | 62 | 75 |

[1] 100 mg. dextran were taken.

EXAMPLE 2

The dextran-synthesizing reaction mixture was prepared at 70 grams of sucrose per 100 ml. of solution as described in Example 1. Such reaction mixtures have a pronounced tendency to produce insoluble aggregated masses of dextran upon prolonged standing. A reaction mixture in which this process had proceeded to such an extent that the solution contained a large volume of curdlike aggregate was used as a source of the small dextran. The solution (750 ml.) was thinned to a workable consistency with 40 percent alcohol and the aggregated masses of dextran were centrifuged out and washed. The masses were suspended in water and dispersed by autoclaving at 120° C. for 30 minutes. High molecular weight dextran was removed by precipitation with 42 percent alcohol and the small dextran obtained by precipitation at 75 percent alcohol. After several reprecipitations, the yield was 53.8 g. Cumulative alcohol precipitation characteristics of the small dextran were determined as in Example 1 and are described in Table II. It is seen that the small dextran isolated by this procedure had a somewhat greater molecular weight than that described in Example 1.

*Table II.—Cumulative alcohol precipitation of B-512 dextran from aggregated synthesis mixture*

| Percent alcohol | Mg. dextran precipitated [1] |
|---|---|
| 42 | 0 |
| 45 | 0 |
| 50 | 0 |
| 53 | 0 |
| 56 | 3 |
| 59 | 8 |
| 62 | 50 |
| 65 | 70 |
| 70 | 90 |
| 75 | 100 |
| 80 | 100 |

[1] 100 mg. dextran were taken.

EXAMPLE 3

*Leuconostoc mesenteroides* NRRL B-1072 was grown in a medium containing 2 percent sucrose, 2 percent corn steep liquor solids, 2 percent monobasic potassium phosphate, and small amounts of nutrient salts. During production of the enzyme, the pH of the culture remained in the region from 6.0 to 7.0 by virtue of the buffering capacity of the phosphate. Upon utilization of all of the sucrose, the culture was centrifuged to remove the bacterial cells, and the culture filtrate was adjusted to pH 5.2 for stability maintenance.

A series of dextran-producing reaction mixtures, varying from 30 to 70 grams sucrose per 100 ml. of solution, was set up as described in Example 1. The dextran-precipitation procedure, leading to the obtaining of cumulative alcohol precipitation curves, was performed as described in Table I. The data obtained are shown in Table III.

Examination of this table verifies the production of both small and large dextran components, as seen in Table I, and it is again evident that the average molecular size of the small component increased as the initial sucrose concentration of the reaction mixture decreased.

*Table III.—Cumulative alcohol precipitation of B-1072 dextran obtained at various sucrose concentrations*

| Sucrose, g./100 ml. of solution | Mg. dextran precipitated [1] | | | | | | | | | |
|---|---|---|---|---|---|---|---|---|---|---|
| | Percent ethanol | | | | | | | | | |
| | 36 | 38 | 42 | 45 | 50 | 55 | 60 | 65 | 70 | 80 |
| 30 | | 46 | 46 | 45 | 49 | 65 | 76 | 84 | 90 | 99 |
| 50 | | 6 | 6 | 9 | 13 | 25 | 67 | 81 | 85 | 92 |
| 70 | | 0 | 0 | 0 | 0 | 0 | 1 | 27 | 55 | 62 |

[1] 100 mg. dextran were taken.

EXAMPLE 4

*Leuconostoc mesenteroides* NRRL B-523, which usually produces a water-insoluble dextran, was grown in the medium described in Example 3. The culture filtrate obtained after removal of cells had a potency of 30 dextransucrase units per ml.

A series of reaction mixtures containing sucrose in the range of 10 to 70 grams per 100 ml. was set up as in Example 1. During the course of the reaction it was noted that none of the flocs of the insoluble-type of dextran ordinarily produced by this strain of microorganism was produced in the flasks containing 60 to 70 grams sucrose per 100 ml. The flocs appeared after the second day in only small quantity in reaction mixtures containing 40 to 50 grams sucrose per 100 ml., and were noted soon after the beginning of the reaction and in considerably heavier amounts at lower sucrose levels. The length of time necessary for completion of the conversion, as evidenced by fructose measurements, varied from 22 hrs. at 10 percent sucrose to 234 hours at 70 grams sucrose per 100 ml., and the amounts of reducing sugars, as determined by the method of Somogyi, Jour. Biol. Chem. 160, 61 (1945), were about 20 to 40 percent greater than those calculated from the amounts of sucrose involved.

The dextran was precipitated from the reaction mixtures at 90 percent alcohol. The total yield of dextran varied from 12 to 23 percent of the theoretical calculated from the sucrose used. Cumulative alcohol fractionations of the water-soluble portion of the dextran showed that relatively small molecular weight polymer predominated. Most of this portion precipitated in each case at alcohol concentrations of 50 percent and greater, and the dextrans produced at sucrose levels of 60 to 70 grams per 100 ml. required alcohol concentrations of above 75 percent to effect precipitation. The dextran product, when reprecipitated, had an infra-red absorption spectrum typical of dextrans.

We claim:

1. The method comprising subjecting an aqueous solution of sucrose having a concentration within the range of 25 grams to 75 grams per 100 ml. of solution to the action of a dextransucrase enzyme, thereby to cause synthesis of dextran of a relatively low molecular weight and recovering said low molecular weight dextran from the reaction medium.

2. The method comprising subjecting sucrose in aqueous solution to the action of dextransucrase, the concentration of sucrose in said medium being within the range of 25 grams to 75 grams per 100 ml. of solution, thereby to cause synthesis of dextran of a relatively low molecular weight and recovering said low molecular weight dextran from the reaction medium.

3. Method of claim 2 in which the dextran of low molecular weight is recovered by the addition of ethanol to the reaction medium.

4. The method of claim 2 in which the dextran produced possesses a molecular weight within the range of 1,000 to 400,000.

5. The method comprising adding sucrose to an aqueous reaction medium containing dextransucrase to produce a solution containing 25–75 grams sucrose per 100 ml. solution thereby to cause synthesis of dextran of a relatively low molecular weight, separating high molecular weight native dextran from said solution when present by the addition of a low molecular weight alkanol, removing the precipitated native dextran and recovering said low molecular weight dextran from the reaction medium by the addition of more low molecular weight alkanol.

6. The method of claim 4 wherein the concentration of sucrose is about 70 grams per 100 ml. and the reaction medium permitted to stand until the dextran forms a curd-like aggregate, and separating the aggregate by thinning with alcohol and centrifuging.

7. The method comprising adding sucrose to an aqueous reaction medium containing dextransucrase to produce a solution containing initially 25–75 grams of sucrose per 100 ml. solution, thereby to cause synthesis of dextran of a relatively low molecular weight, separating high molecular weight native dextran from said solution by the addition of a low molecular weight alkanol added to bring the alkanol concentration to approximately 50 percent, removing the precipitated native dextran and recovering said low molecular weight dextran from the reaction medium by the addition of more low molecular weight alkanol.

HAROLD J. KOEPSELL.
HENRY M. TSUCHIYA.
NISON N. HELLMAN.

References Cited in the file of this patent

UNITED STATES PATENTS

| Number | Name | Date |
|---|---|---|
| 2,392,258 | Owen | Jan. 1, 1946 |

OTHER REFERENCES

Evans et al.: Bacterial Polysaccharides (reprint from adv. in Carbohydrate Chemistry, vol. II, Academic Press); Scientific Report Series, No. 6, Sugar Research Foundation, Inc., N. Y., April 1947; article, pages 203–233: pages 211, 216, 217 relied upon.

Hehre et al.: Jour. Bact. 55, (1948) pages 197–208. Pages specifically relied upon are 204–205.